(12) United States Patent
Berke

(10) Patent No.: US 10,514,558 B2
(45) Date of Patent: Dec. 24, 2019

(54) ORTHOKERATOLOGICAL LENS-EYE SYSTEM FOR STROMAL REMODELING

(71) Applicant: William Berke, Santa Ana, CA (US)

(72) Inventor: William Berke, Santa Ana, CA (US)

(*) Notice: Subject to any disclaimer, the term of this patent is extended or adjusted under 35 U.S.C. 154(b) by 89 days.

(21) Appl. No.: 15/613,046

(22) Filed: Jun. 2, 2017

(65) Prior Publication Data

US 2018/0024381 A1 Jan. 25, 2018

Related U.S. Application Data

(60) Provisional application No. 62/365,320, filed on Jul. 21, 2016.

(51) Int. Cl.
*G02C 7/04* (2006.01)
*G02C 7/02* (2006.01)

(52) U.S. Cl.
CPC ............ *G02C 7/047* (2013.01); *G02C 7/027* (2013.01); *G02C 7/028* (2013.01); *G02C 2202/06* (2013.01)

(58) Field of Classification Search
CPC . G02C 7/02; G02C 7/04; G02C 7/047; G02C 7/027; G02C 7/028; G02C 2202/06; A61B 3/125; A61B 3/1015; A61B 3/107

USPC ... 351/159.23, 219, 161, 160 R, 160 H, 177, 351/247, 246

See application file for complete search history.

(56) References Cited

U.S. PATENT DOCUMENTS

| 6,582,077 B1* | 6/2003 | Tabb | G02C 7/047 |
| | | | 351/159.74 |
| 2011/0285958 A1* | 11/2011 | Berke | G02C 7/047 |
| | | | 351/159.76 |

* cited by examiner

*Primary Examiner* — Jie Lei
(74) *Attorney, Agent, or Firm* — Sheppard Mullin Richter & Hampton LLP

(57) ABSTRACT

An orthokeratological contact lens includes a treatment zone extending radially outward from a center point and return and alignment zones extending radially outward from the treatment zone, the return zone shaped to create an empty hypertrophy volume between the lens and the cornea when the lens is applied to the cornea, wherein the treatment zone is shaped based on a target treatment curve as to cause collagen fibrils located in a stroma of a cornea to shorten and flatten the cornea in the treatment zone and to lengthen and steepen it in the return zone when the rigid contact lens makes contact with the cornea without putting excessive pressure on or compressing the cornea, the treatment curve being based on a difference between a first arc length determined when a load is applied to the cornea and a second arc length determined when no load is applied to the cornea.

9 Claims, 10 Drawing Sheets

External Pressure $$P = \frac{2 \Delta t\, t^2 E}{[Ar(1 - v^2)\,1/2]} \approx 2mm\, Hg$$

- $\Delta t$: Thickness Change $\cong$ Result of Munnerlyn's Formula

- t: Cental Cornea Thickness

- E: Young's Modulus

- A: Central Zone. Area of Applanation

- r: Corneal Radius

- v: Poisson Ration = 0.49

FIG. 9

Surface Area of Spheric Section
$A = 2\pi rh$

Finding h
$h = r - 1/2 \sqrt{4r^2 - a^2}$

ORTHOKERATOLOGICAL LENS-EYE SYSTEM FOR STROMAL REMODELING

REFERENCE TO RELATED APPLICATIONS

This application claims the benefit of U.S. Provisional Patent Application No. 62/365,320, filed on Jul. 21, 2016, the content of which is incorporated herein by reference in its entirety.

TECHNICAL FIELD

This disclosure relates generally to corrective lens technology, and more particularly, some embodiments relate to systems and methods for stromal remodeling.

BACKGROUND

Millions of people experience difficulties with their vision due to a number of common refractive conditions such as myopia (nearsightedness) and hyperopia, (farsightedness). Myopia is a visual abnormality where an eye cannot focus on far-away objects because the cornea is curved too steeply and/or the eye is elongated axially front to back, such that it fails to provide a sharp focus of light at the retinal plane of the eye. On the other hand a hyperopic eye may focus on either far or near objects because the curvature of the cornea of the eye is too flat and/or too short axially front to back to provide adequate focusing at the retinal plane of the eye.

Another common refractive vision problem is astigmatism, which may exist in combination with either myopia or hyperopia. With astigmatism, unequal curvatures of one or more refractive surfaces of the eye prevent light rays from focusing sharply at the plane on the retina, thereby resulting in blurred vision. Yet another common vision problem is presbyopia, which may occur with other refractive problems such as hyperopia, myopia, and/or astigmatism. Presbyopia is the most common vision problem in adults 40 years of age and older. At this age, many people begin to experience difficulty focusing on close objects, most commonly due to the loss of flexibility of the eye's focusing apparatus.

There exist numerous known methods for treating myopia. One conventional method of correcting the visual blur caused by myopia involves wearing a pair of concave (minus powered) spectacle lenses. In some cases, the visual blur caused by myopia may be corrected with concave (minus powered) contact lenses. In the 1970's and 1980's attempts were made to permanently correct myopia through surgical procedures such as radial keratometry (RK). More recently, approaches to correcting myopia through laser surgical reshaping of the cornea (e.g., PRK, LASIK, LASEK) have become popular.

Orthokeratology is a further approach for treating myopia, wherein the corneal shape is altered by wearing rigid contact lenses designed to continually exert pressure on selected locations of the cornea to gradually mold the cornea into the desired corneal curvature. Referring to FIG. 1, a cornea 250 is depicted in a manner showing each of the five layers of tissue: epithelium 200, Bowman's layer 210, stroma 220, Descemet's membrane 230 and endothelium 240. With reference now to FIG. 2, a cornea 2 is depicted including an epithelium 3 comprising a thin layer of cells that cover the surface of the cornea. Epithelium includes an outer surface 4 and an inner surface 8. In FIG. 2, the cornea 2 is shown in juxtaposition with a known contact lens 6, wherein a centerline 20 of the cornea 2 is indicated for purposes of orientation. During conventional orthokeratology treatment, the outer surface 4 of epithelium 3 is compressed against the inner surface of a relatively flat contact lens 6 such that it is believed to be thinned, thus creating a refractive adjustment or correction in the cornea. In actuality, FIG. 3 represents the actual tissue shape change.

After the refractive adjustment, a retainer lens is worn on a part-time basis to prevent the cornea from returning to its previous shape. This "maintenance period" lasts for an extended amount of time after removal of the corrective rigid contact lens. The successfulness of orthokeratology treatment depends on various factors including the shape and structure of the contact lens. For example, a conventional contact having a central radius of curvature that is larger than the central radius of the cornea (i.e., a "flat" contact lens) is widely believed to change the shape of the cornea. The reshaped cornea has a lengthened radius of curvature in its central zone, thereby reducing or eliminating the myopia.

Orthokeratology ("OK") has been performed with varying degrees of success since the early 1970's. Three factors that impact the effectiveness and desirability of orthokeratology procedures and lenses include: (1) the time needed to achieve the desired visual correction; (2) the amount of myopia that can be corrected using orthokeratology; and (3) the maintenance period before the correction degrades. Regarding the time needed to achieve the desired visual correction, conventional orthokeratology techniques typically require an extended amount of time to accomplish a relatively small amount of myopia reduction. In addition, conventional orthokeratology techniques and lenses provide an inadequate maintenance period duration. In particular, a patient must frequently wear a retainer lens in order to increase the time between corrective sessions with the orthokeratology lens.

Corrective lens design has generally relied on an understanding that the OK effect is based primarily on changes in the corneal epithelium. Many theories have been presented to explain the changes in corneal tissue that result in the refractive changes in OK. Changes in corneal tissue that result in the refractive changes in OK have been historically attributed to central epithelial cell compression, thinning and migration and/or mid-peripheral thickening, mid-peripheral hyperplasia, increased cell retention, or decreased epithelial sloughing. However, evidence has revealed that changes in corneal tissue that result in refractive changes in OK is attributed to characteristics of the corneal stroma.

The cornea's stroma is made of a protein called collagen that forms into fibril layers. Mid-peripheral thickening is caused by the lengthening of the collagen fibrils locally, without a chord diameter change, thus shortening its radius of curvature, steepening the corneal surface and increasing the corneal sagitta in the mid-periphery. Central flattening of the corneal surface is caused by the shortening of the collagen fibrils locally, without a chord diameter change, thus lengthening its radius of curvature, and decreasing the corneal sagitta in the central treatment zone. The change of length and radius that occurs in the fibril is caused by specific and measurable pressure gradient changes that may be attributed to contact from a surface of an OK lens.

BRIEF SUMMARY OF THE EMBODIMENTS

According to various embodiments of the disclosed technology, systems and methods for stromal remodeling include a lens-eye system configured to cause changes in shape of a cornea by applying pressure to a surface of the cornea, resulting in mid-peripheral thickening of the stroma caused by lengthening of collagen fibrils locally.

Embodiments disclosed herein provide a method for shaping and/or applying an OK contact lens. Embodiments of the method include receiving patient corrective parameters and generating a target treatment curve for a target zone, wherein generating the target treatment curve comprises calculating a difference of a first arc length determined when a load is applied to the cornea and a second arc length when no load is applied to the cornea. The contact lens comprises a parabolic lens having an inner surface configured to face an epithelium of the patient's cornea, wherein the parabolic lens is adapted to reshape the cornea by way of stromal remodeling via collagen fibril lengthening or shortening from the strain induced by the stress imposed by the unique lens design. The change in fibril length without a change in its chord diameter changes its radius of curvature and hence changes the radius on the corneal surface. There is no stromal hypertrophy just a radius and resultant sagittal height change. Collagen is a linear elastic solid material and its measurement (Young's Modulus) can be expressed precisely and mathematically. In pre-treatment configuration, an outer surface of the epithelium does not conform to the contours of the inner surface of the parabolic lens such that there exists a gap comprising a volume and 'phantom' lens shape that is disposed between the epithelium and the parabolic lens. This gap becomes obliterated with the induced sagittal height change and thereby eliminates the undesired refractive error.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 9 is a formula for external pressure.

The figures are not intended to be exhaustive or to limit the invention to the precise form disclosed. The figures are not drawn to scale. It should be understood that the disclosed technology can be practiced with modification and alteration, and that the disclosed technology be limited only by the claims and the equivalents thereof.

DETAILED DESCRIPTION OF THE EMBODIMENTS

Embodiments of the present disclosure are directed towards corrective lenses, and more particularly, towards a lens-eye system for stromal remodeling by shaping and applying an OK lens to the corneal surface to cause mid-peripheral thickening by lengthening of collagen fibrils locally, without a chord diameter change and central corneal flattening by shortening of collagen fibrils locally, without a chord diameter change. Embodiments disclosed herein are also directed towards methods of designing OK lenses configured to remodel the stroma according to the principles described above.

Figure 3:
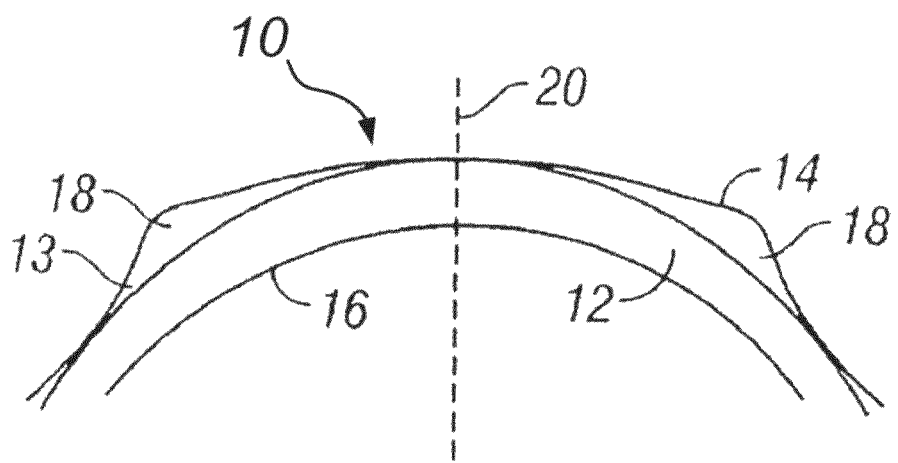
FIG. 3 illustrates a cross sectional view of an orthokeratological contact lens for reshaping a patient's cornea by epithelium tissue repositioning, consistent with embodiments disclosed herein.

FIG. 3 illustrates a cross sectional view of an orthokeratological contact lens for reshaping a patient's cornea by epithelium tissue movement. Referring to FIG. 3, a cornea 10 having centerline 20 is depicted for treatment with a parabolic contact lens 14 having an inner surface facing epithelium 12. Epithelium 12 includes an outer surface 13 and an inner surface 16. In accordance with the principles of the present invention, in a pre-treatment configuration, outer surface 13 of epithelium 12 does not conform to the contours of the inner surface of contact lens 14 such that there exists a gap 18 or hypertrophy volume 18 between the epithelium 12 and the contact lens 14. The hypertrophy volume 18 is created due to the relative flatness of the contact lens 14 relative to cornea 10. The contact lens 14 helps reshape the cornea 10 when worn by a patient because over time the epithelium 12 conforms the contours of the inner surface of contact lens 14 as outer surface 13 moves outwardly toward contact lens 14. Outward movement in this context refers to movement of the outer surface 13 toward contact lens 14 and does not refer to migration of epithelium cells such as that theorized by conventional orthokeratology treatments. After the contact lens 14 has been worn by the patient for a sufficient amount of time, the hypertrophy volume 18 is filled by the outward movement of epithelium 12, thereby achieving the desired refractive adjustment of the eye.

Figure 4:
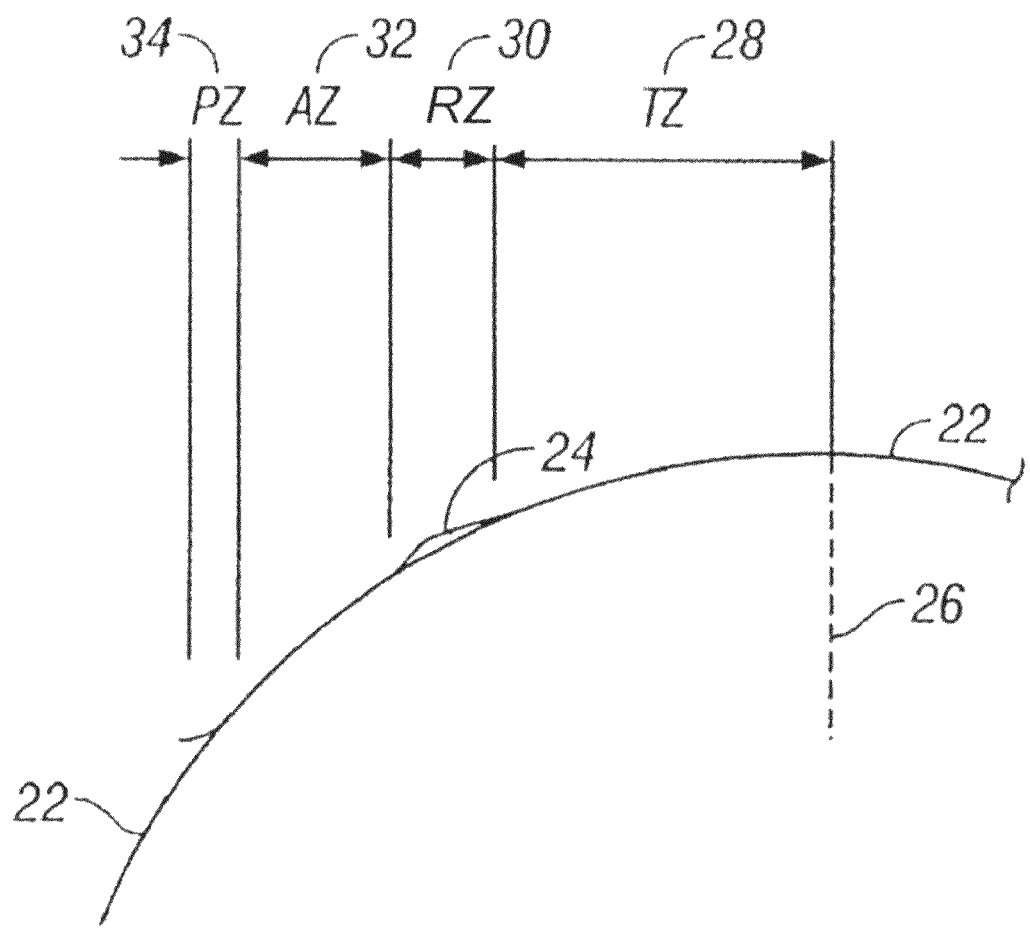
FIG. 4 illustrates a cross sectional view of an orthokeratological contact lens disposed on a corneal surface, consistent with embodiments disclosed herein.

FIG. 4 illustrates a cross sectional view of an orthokeratological contact lens disposed on a corneal surface. Calculated data can give the exact widths and curves of the treatment zone (TZ), return zone (RZ) and alignment zone (AZ) needed for the optimum lens design and not just approximations or based on normative data. The optimum lens design has the smallest area of AZ needed in the largest overall lens diameter (OAD) allowable depending on the individual corneal size to then end up with the largest TZ affordable. Referring to FIG. 4, a cornea 22 is reshaped by the inside surface of contact lens 24, which includes four curved zones comprising treatment zone 28, return zone 30, alignment zone 32, and peripheral zone 34 ("PZ"), wherein the centerline 26 of the cornea 22 is indicated for orientation. The treatment zone 28, return zone 30, alignment zone 32 and peripheral zone 34 preferably each include a predetermined width and curvature. According to the preferred embodiment of the invention, each curved zone is parabolic to maximize the effect on the cornea. In addition, the width of treatment zone 28 is preferably optimized to obtain the desired eye corrective result, and the return zone 30 and the alignment zone 32 are preferably designed to meet the particular characteristics of the cornea.

Figure 5A:
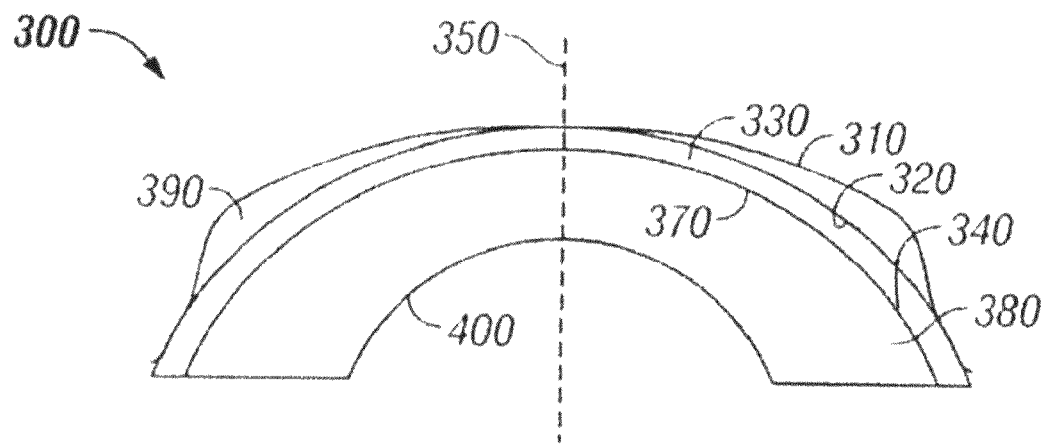
FIG. 5A illustrates a cross section view of an orthokeratological contact lens disposed on a corneal surface, consistent with embodiments disclosed herein.
Figure 5B:
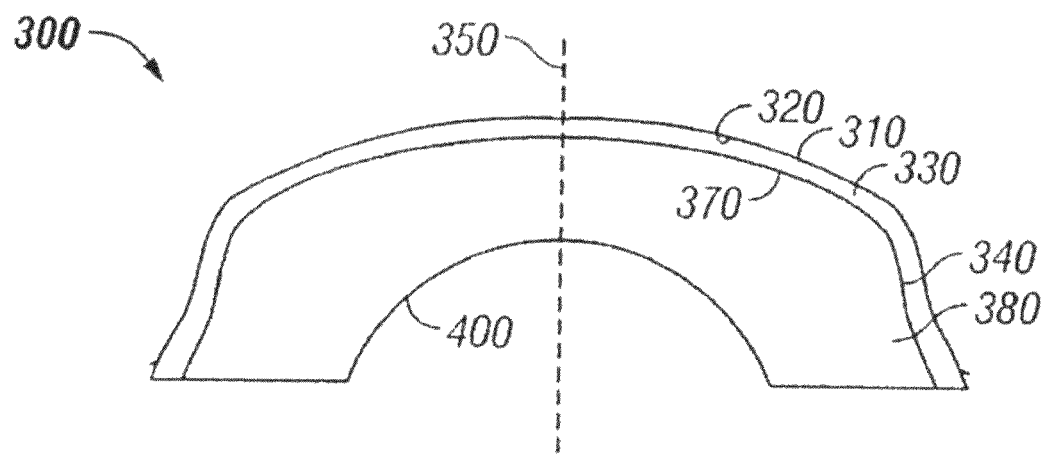
FIG. 5B illustrate a cross section view of an orthokeratological contact lens with stromal tissue growth and outward movement of the epithelium tissue, consistent with embodiments disclosed herein.
Figure 6A:
FIG. 6A illustrates a cross section view of an orthokeratological contact lens disposed on a corneal surface, consistent with embodiments disclosed herein.
Figure 6B:
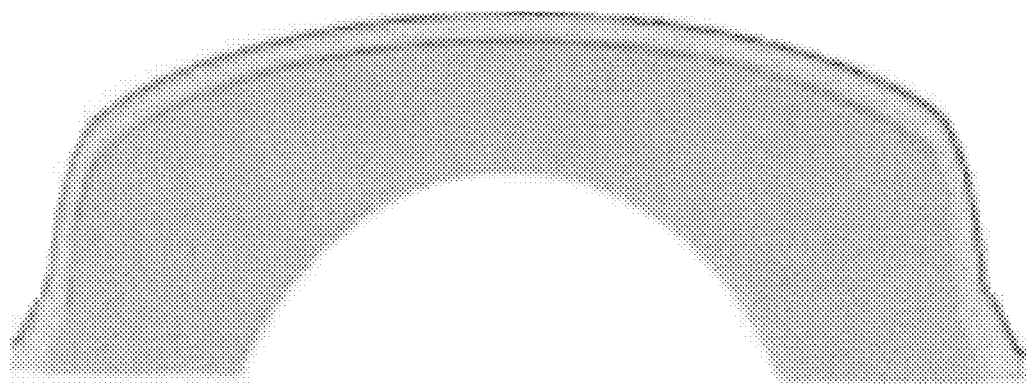
FIG. 6B illustrate a cross section view of an orthokeratological contact lens with stromal tissue growth and outward movement of the epithelium tissue, consistent with embodiments disclosed herein.

FIGS. 5A, 5B, 6A, and 6B illustrate cross section views of an orthokeratological contact lens disposed on a corneal surface with stromal tissue growth and outward movement of the epithelium tissue. Referring now to FIG. 5A and FIG. 5B, a cornea 300 with centerline 350 is illustrated. These figures also depict contact lens 310, epithelium 330 having outer surface 320 and inner surface 340, stroma 380 having outer surface 370 and inner surface 400, and hypertrophy volume 390. The outward movement of epithelium 330 is caused by mid-peripheral thickening of the stroma 380. The mid-peripheral thickening of the stroma 380 is caused by the lengthening of the collagen fibrils locally in response to pressure applied by an OK lens to the corneal surface, without a chord diameter change. Accordingly, the stromal radius of curvature is shortened, steepening the corneal surface and increasing the corneal sagitta in the mid-periphery. The change of length and radius that occurs in the fibril is caused by specific and measurable pressure gradient changes that are attributed to contact from a surface of an OK lens, as described herein. The result is repositioning of epithelium 330, which moves outer surface 320 outward toward contact lens 310 such that hypertrophy volume 390 is filled by cornea tissue.

FIG. 5A and FIG. 5B illustrates an increased volume of stroma 380 and illustrates outer surface 320 of epithelium 330 moved outward toward contact lens 310 such that hypertrophy volume 390 has been filled. Inner surface 340 of epithelium 330 and inner surface 400 of stroma 380 may be used to calculate the hypertrophy volume 390 required for the desired refractive adjustment of the eye. After the contact lens 310 has been worn by the patient for a sufficient amount of time, the hypertrophy volume 390 is filled by the outward movement of epithelium 330, thereby achieving the desired refractive adjustment of the eye.

Figure 1:
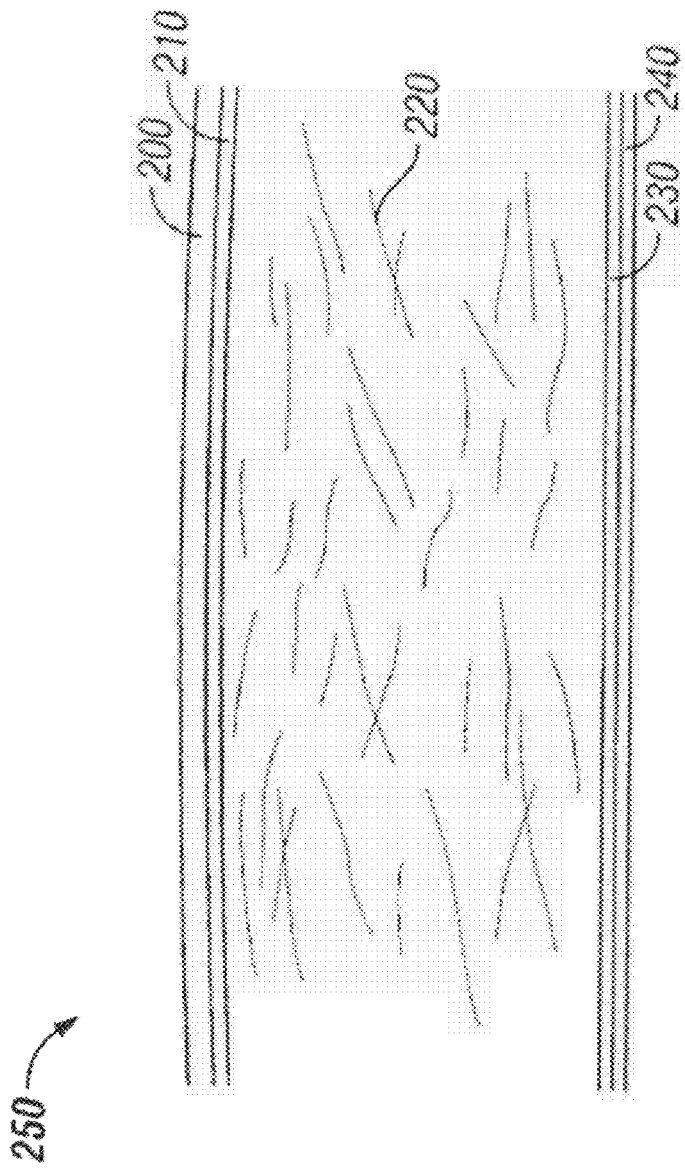
FIG. 1 (Prior Art) illustrates a cross sectional view of a cornea illustrating the cornea's five layers of tissue.
Figure 2:
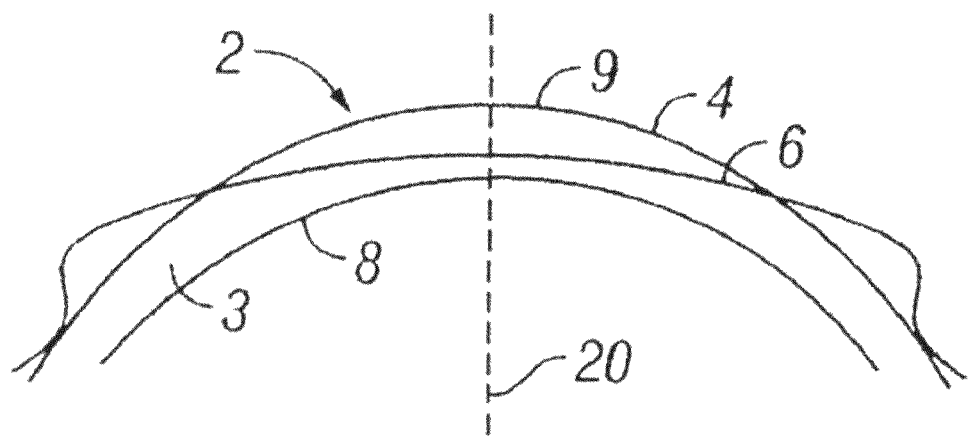
FIG. 2 (Prior Art) illustrates a cross sectional view of a cornea illustrating a known approach to an orthokeratological reshaping of the cornea by central epithelial thinning.

Referring to FIGS. 1, 3, 4, 5A, and 5B, the orthokeratology contact lens 24 rests on the cornea 22 of a patient's rather than putting significant pressure on the eye tissue, as is the case with many conventional contact lenses, including the contact lens 6 depicted in FIG. 2. From a physiologically standpoint, there may be no compression of the epithelium or migration of cells due to the contact lenses. Instead, the contact lenses may be designed to cause epithelial cell and/or stroma cell movement into the hypertrophy volume 18 (see FIG. 3 and FIGS. 5A and 5B). As epithelial tissue and/or stroma tissue moves into the hypertrophy volume 18, a new lens shape forms that corrects the myopic condition of the eye.

In some embodiments, an orthokeratology contact lens may be employed to optimize the diameter of treatment zone 28. Specifically, the contact lens may be used to determine the largest wearable overall contact lens diameter that will bring about the greatest refractive change in the patient's eye. Then, the orthokeratology contact lens may be used to determine appropriate widths for the return=zone 30 and the alignment zone 32. The resulting lens design may therefore be determined by a patient's individual corneal shape. Advantageously, such a lens design enables a great amount of change in eye shape in a short time and results in a longer maintenance period for the corrected eye.

As discussed in more detail below, embodiments disclosed herein provide for stromal remodeling by causing physiological changes to the stroma alone. Specifically, the collagen of the stroma, a protein that has a unique natural characteristic that enables it to change its length and radii and hence refractive power based on stress and strain pressures.

Optical properties of the cornea may be calculated according to Equation 1 below.

$$D = D_1 + D_2 - \frac{t}{n_c} D_1 D_2 \qquad (1)$$

$$D_1 = \frac{n_c - 1}{r_1}$$

$$D_2 = \frac{\lambda aq - n_c}{r_2}$$

$r_1$: anterior radius $r_2$: posterior radius $t$: central corneal thicknes

Optics in the cornea depends on characteristics of the cornea and, for example: (i) demands on corneal biochemistry, (ii) anisotropic stromal architecture, (iii) the physicochemical properties of collagen, (iv) forces and pressures that may act on the stroma, and (v) corneal pressure and stromal tensile stress. By way of example, demands on corneal biochemistry can include tensile-loaded capacity (e.g., collagens), tensile stress (e.g., intraocular pressure and extraocular muscles, cardiac cycle, extraocular muscles and accommodation), shearing forces (e.g., lid movement), compressive strength (lid pressure), intraocular pressure, swelling pressure, shape memory (e.g., collagens, proteoglycans), return to original spherical geometry with aging, and myopia regression after stopping orthokeratology. Anisotropic stromal architecture includes, without limitation, the microstructure of the stroma is highly heterogeneous, depending on the specific region and corneal layer being evaluated, the anterior central stromal lamellae are more closely packed and interwoven than are other regions of the cornea, the anterior stroma is less hydrated than the posterior stroma with stronger junctions between collagen lamellas, the anisotropy in stromal architecture results in mechanical anisotropy, and the anterior stroma holds a main importance in maintaining the corneal strength and hence curvature.

With respect to collagen, physico-chemical properties, both corneal structure and optical power are determined by stromal collagen. Collagen is not a totally rigid molecule. Instead, collagen includes elastic domains having nearly no proline and 4-hydroxy-proline, as well as rigid domains rich of proline and 4-hydroxyproline. Deformation of collagen may be accomplished by: (i) elongation of elastic domains, (ii) sliding of triple helices, (iii) elongation of micro-kinks, and (iv) stromal proteoglycans are a cause of corneal viscoelasticity. Forces and pressures that may act on the stroma include external forces such as intraocular pressure, tear film surface tension, extra ocular muscles, and contact lenses, as well as internal forces such as osmotic pressure. Pressure and tensile stress within cornea includes intraocular pressure (IOP) and tear film surface tension (ST), wherein P=IOP−PST. Regarding stromal tensile stress (reduced without c1), $\sigma_f$=Pr/2d such that $\sigma_f \approx$15,000 Pa. Collagen is elongated by tensile stress and thus neutralizes mechanical load. Stromal tensile stress causes elongation of collagen fibrils by $\Delta$1. According to Hooke's law, $\sigma$=E$\varepsilon$ with $\in$=$\Delta$l/l, wherein $\in$ is Young's modulus, which can be 0.29 MPa in a standard human cornea. Collagen fibrils store potential energy during elongation. Elastic shortening of collagen fibrils can occur when corneal pressure is reduced. Forces and pressures acting in the cornea can elongate or shorten collagen fibril length. The chord diameter remains unchanged. Longer fibrils steepen the radius, while shorter fibrils flatten the radius. This is what happens when you wear an OK lens which imposes hydrostatic forces.

Increased stromal tensile stress causes an elongation of corneal fibrils by a specific length and you can correlate deformed length change (strain) with stress. Lenses may be designed in accordance with the above characteristics and concepts to regulate local pressure in the cornea and controlling its effect on stromal tensile pressure. For example, in the treatment zone of an OK lens (TZ), the lens may be designed to cause an increase in central external pressure which decreases internal pressure and the fibrils shorten, the radius flattens and the anterior of the cornea flattens. In the mid-periphery in the Return Zone (RZ), the external pressure may be reduced making the internal pressure rise, thereby lengthening the fibrils and making them steeper, and the anterior cornea steeper. Change in length equals change in radius, while the chord length remains the same. The pressure gradient follows the profile of the lens. The lens may, thus, be mathematically designed using areas and volumes along every axis of the topography. Furthermore, the anisotropy in stromal architecture results in mechanical anisotropy. Deformation of collagen occurs by elongation of elastic domains, sliding of triple helices and elongation of micro kinks. The importance of the anterior stroma is strength and curvature. Depending on the amount of Rx change desired the lens parameters will be designed around the stresses needed to specifically elongate and steepen; shorten and flatten the anterior cornea and dictate the resultant lens OAD, TZ and AZ widths and curves the goal always being to end up with the largest TZ obtainable.

The specific shape and dimensions of the lens may be precisely quantified mathematically in target regions of the stroma and the lens designed to balance the push-pull equilibrium between the attraction force in the AZ and the repulsion force in the TZ. The aspheric curvatures needed in the TZ and RZ to distribute the force necessary to shape the cornea is calculable. Specific and local curvature can be controlled mathematically using algorithms described herein because of the known physico-mechanical properties of the collagen. The induced pressure gradients, which influence the stroma, locally thickens or thins the stroma by changes in the collagen fibril lengths induced by pressure changes which varies the radii of curvature of the cornea which in turn varies the sagitta and refractive power.

Lens designs may be constrained by surface areas covered and volume of stroma beneath the areas calculated. That volume corresponds to the "phantom" lens volume desired to sit on top of the cornea. The greater the refractive error the greater the volume needed. The greater the stromal volume available the greater the amount of change obtainable. When the stromal volume falls short of the "phantom" lens volume needed, the lens TZ is reduced and the AZ area is increased. Any contact lens reduces the pressure within the stroma. A lower stromal pressure causes shortening of the collagen fibers. Shorter collagen fibers result in increased anterior cornea radius. Corneal radii, as opposed to thickness, are a primary value used to calculate the refractive power of the cornea.

Figure 7:
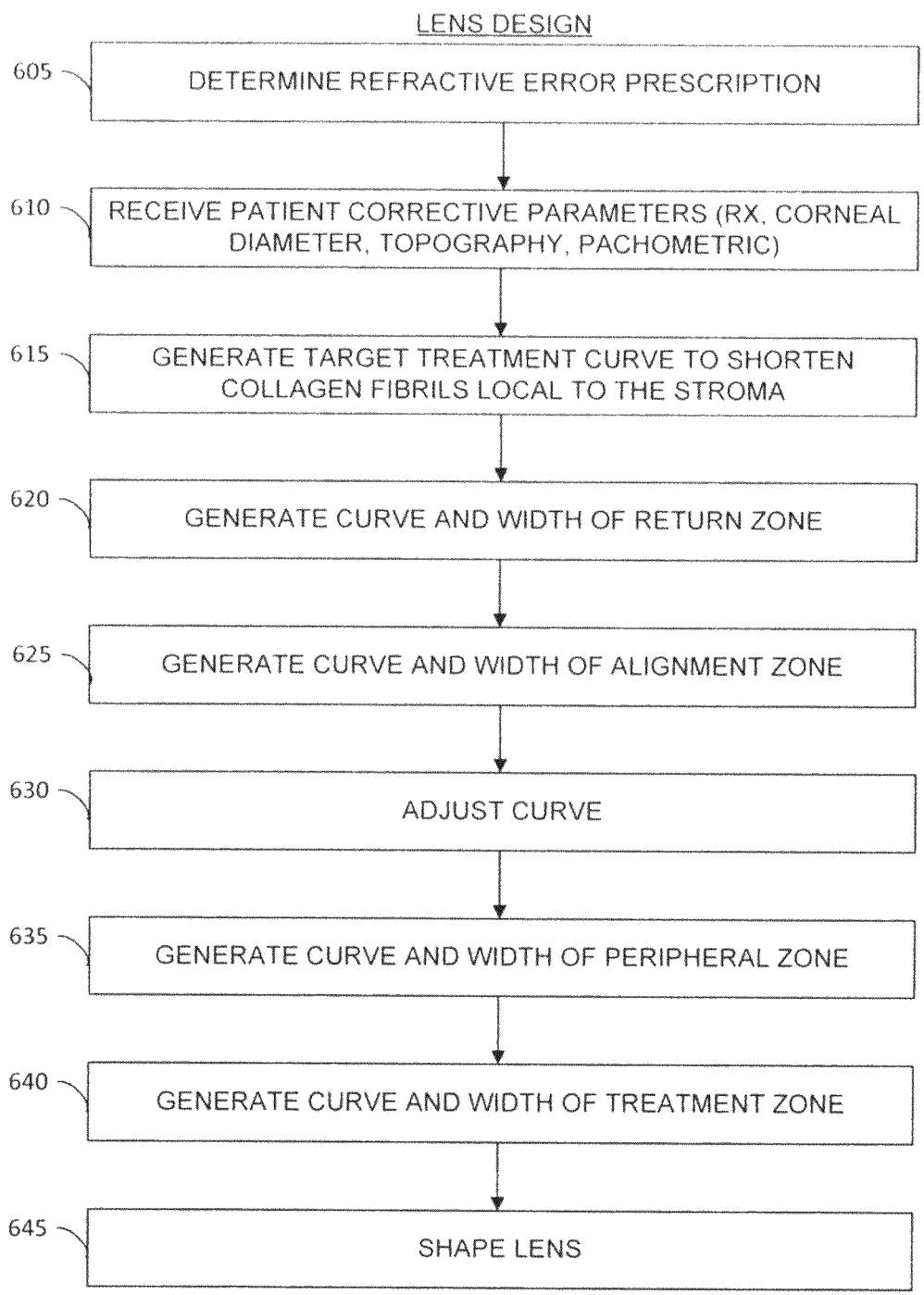
FIG. 7 is a block diagram depicting a method of producing an orthokeratological contact lens for reshaping a patient's cornea by lengthening of the collagen fibrils local to the stroma, consistent with embodiments disclosed herein.

FIG. 7 is a block diagram depicting a method of producing an orthokeratological contact lens for reshaping a patient's cornea by selectively lengthening of the collagen fibrils local to the stroma and selectively shortening of the collagen fibrils local to the stroma. Referring to FIG. 7, a method of designing a lens in accordance with the above characteristics may include determining a refractive error prescription at step 605 and receiving patient corrective parameters, e.g., Rx change desired; corneal diameter, thickness, and topography at step 610. The patient corrective parameters may be received by an OK lens generation system, e.g., that may include a processor with non-transitory computer readable media, data storage, and software embedded thereon. The software may be configured to perform the steps described herein.

Figure 8A:
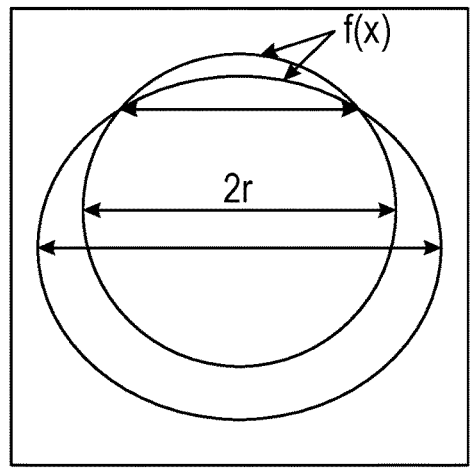
FIG. 8A is a plot illustrating the effect of stress applied to the stroma on arc length and anterior radius, consistent with embodiments disclosed herein.
Figure 8B:
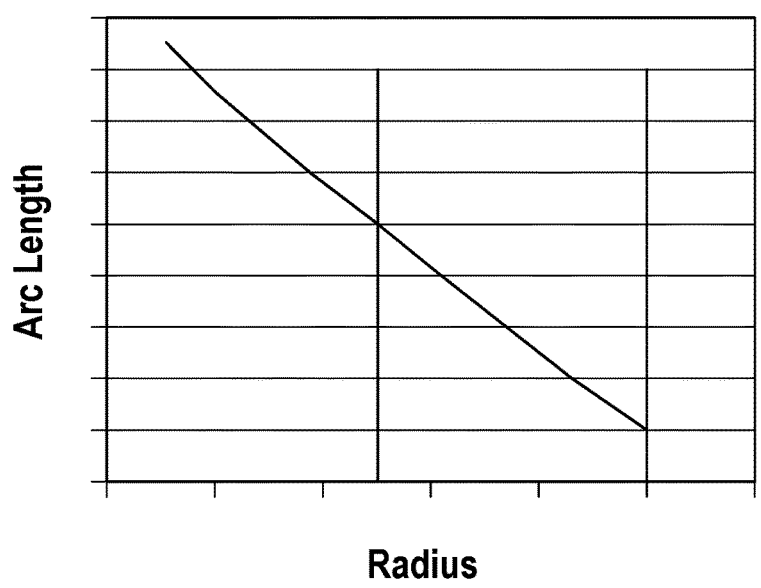
FIG. 8B is a graph illustrating a relationship between radius and arc length, consistent with embodiments disclosed herein.
Figure 10A:
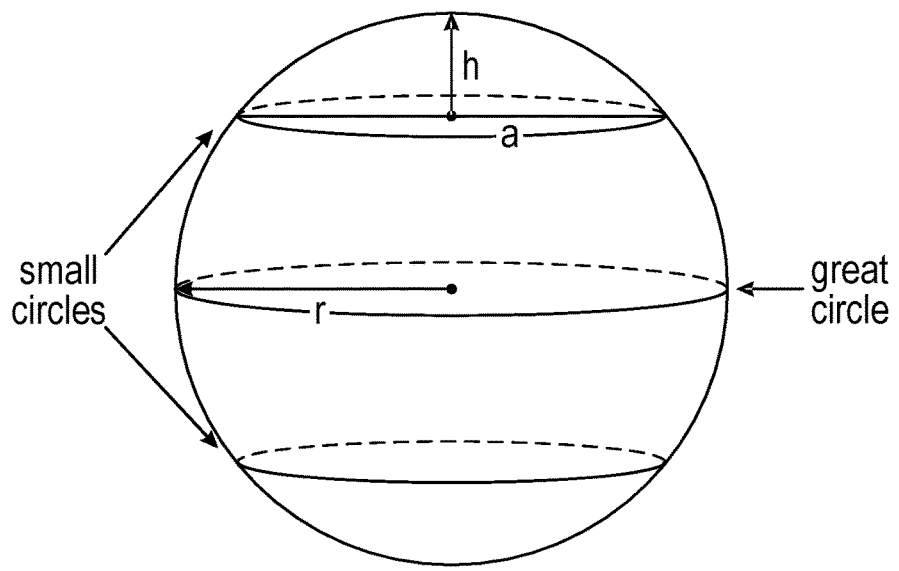
FIG. 10A is a plot illustrating surface area of a spherical section.
Figure 10B:
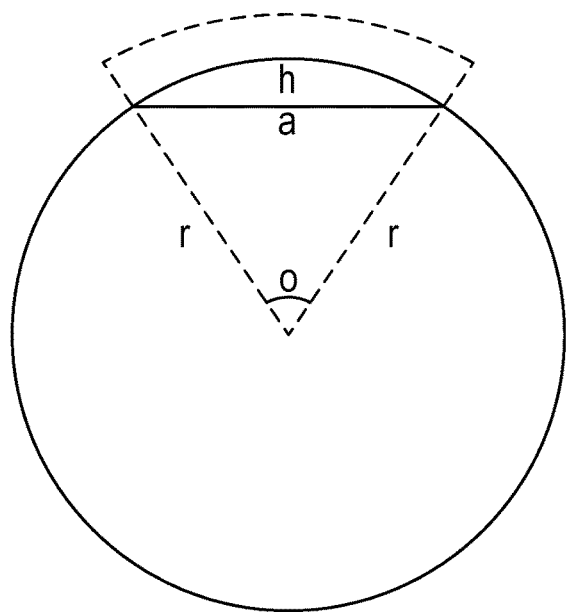
FIG. 10B is a plot illustrating the calculation of arc length h for a given radius r.

A method for designing a lens may further include generating a target treatment curve to lengthen collagen fibrils local to the stroma at step 615. For example, the OK lens generation system may calculate the external burden and find its direct relationship to the change in arc length. Ultimate refinements determine exactly how wide the AZ needs to be to create the appropriate cohesive force to pull the lens onto the eye and override the push off force in the TZ. The greater the amount of change needed the greater the push off force. The relationship may be calculated as follows (as illustrated in FIGS. 8-10).

1. Estimation of $\sigma$ (Change of Arc Length)

The arc length can be calculated using the following well known formula from differential geometry:

$$l = \int_{-d}^{+d} \sqrt{1 + (f'(x))^2}\, dx \tag{2}$$

To solve this integral, one requires some knowledge regarding the function f(x) that describes the corneal topography within one meridian. In one example, the OK lens generation system may assume that f(x) represents a sphere. In another example, f(x) represents a parabola. Assuming, for example, f(x) is an aspheric parabola, the following relationship holds:

$$f(x) = ax^2 + bx + c \tag{3}$$

The coefficients a, b and c are OCT measurements of the cornea using the sagittal height. A set of formulas can be derived from Scheimpflug cameras (e.g. Pentacam). The OK lens generation system may compare f(x) in a baseline state, as well as f(x) after an external load is applied, and then solve equation 2 under each set of conditions to determine the difference in arc lengths. Optical correction 3 Dpt; change in radius: 0.50 mm; change in arc length: 20 µm.

2. Estimation of the External Load.

Hooke's law may be used to determine f(x) under an external load.

$$\sigma = E\varepsilon \text{ with } \varepsilon = \Delta l/l \quad (4)$$

Utilizing Young's modulus E, the external load may be calculated. The force needed to shorten collagen fibrils by 20 µm is 2 mm Hg which is supplied by the contact lens. 20 µm flattens corneal curve by 0.50 mm and equates to ~3 Dpt. Final Adjustments based on corneal topography and thickness.

Referring again to FIG. 7, a method for designing an OK lens may also include generating a curve and width of the return zone at step 620 in relation to the target treatment curve calculated at step 615. The method may also include generating a curve and width of the alignment zone at step 625 in relation to the curves for the target zone and return zone. Each of steps 610-625 may be performed by the OK lens generation system via automated or manual modes.

The method may also include generating an adjusted curve at step 630 and generating a curve and width of the peripheral zone at steps 630 and 635, respectively. The method may further include generating a curve and width of the treatment zone at step 640, and shaping the lens at step 645 in accordance with the curves calculated in steps 610-640. The OK lens may then be applied to a cornea to apply pressure and reshape the cornea in accordance with the calculations described above.

Figure 11:
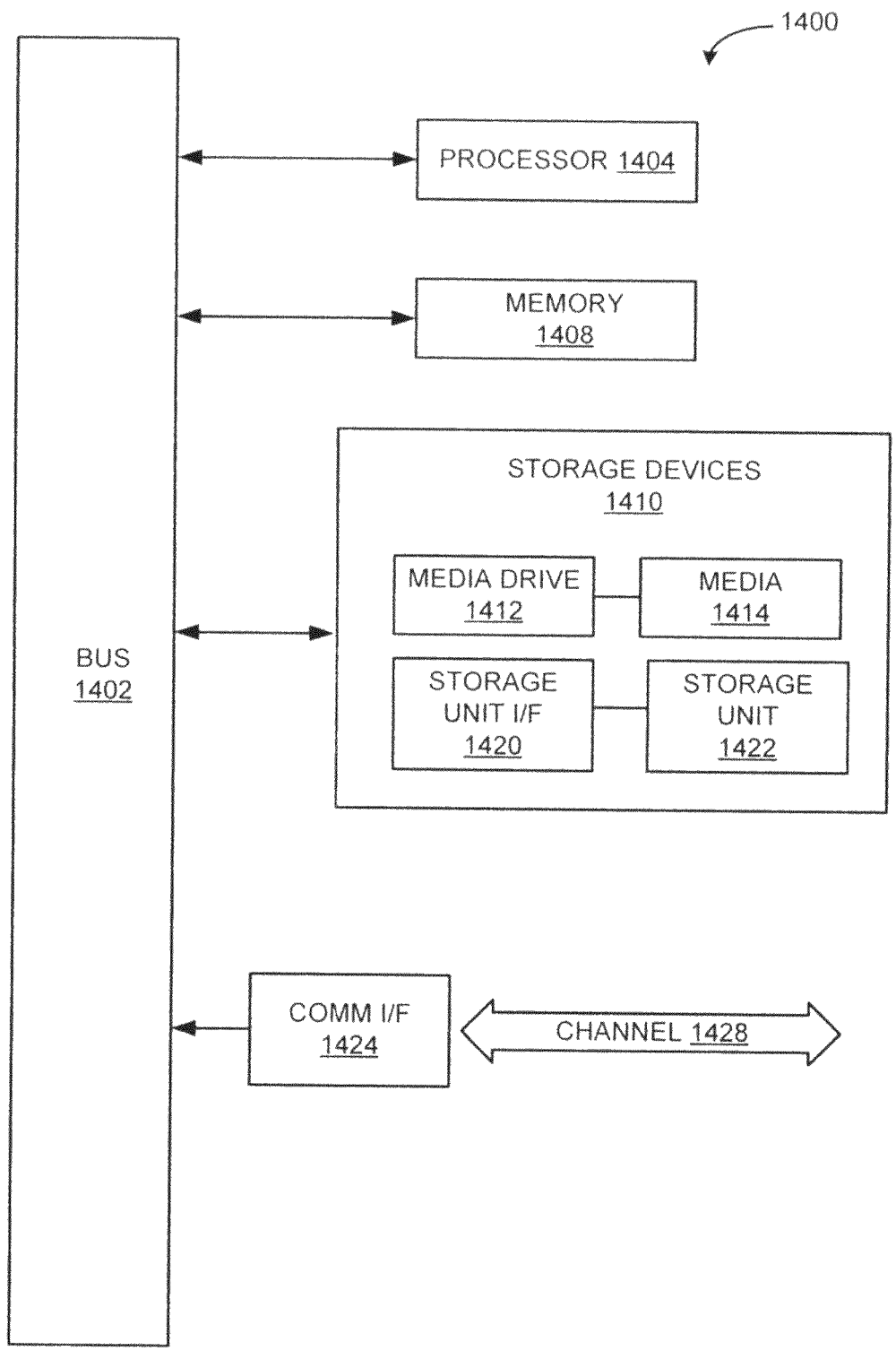
FIG. 11 illustrates an example computing module that may be used in implementing various features of embodiments disclosed herein.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, PLC's, CPLDs, FPGAs, RTU's, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that physically or electrically separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 1400. After reading this description, it will become apparent to a person skilled in the relevant art how to implement the technology using other computing modules or architectures.

Referring now to FIG. 11, computing module 1400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1400 might include, for example, one or more processors, controllers, control modules, or other processing devices, such as a processor 1404. Processor 1404 might be implemented using a general-purpose or special-purpose processing engine such as, for example, a microprocessor, controller, or other control logic. In the illustrated example, processor 1404 is connected to a data bus 1402, although any communication medium can be used to facilitate interaction with other components of computing module 1400 or to communicate externally.

Computing module 1400 might also include one or more memory modules, simply referred to herein as main memory 1408. For example, preferably random access memory (RAM) or other dynamic memory, might be used for storing information and instructions to be executed by processor 1404. Main memory 1408 might also be used for storing temporary variables or other intermediate information during execution of instructions to be executed by processor 1404. Computing module 1400 might likewise include a read only memory ("ROM") or other static storage device coupled to bus 1402 for storing static information and instructions for processor 1404.

The computing module 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing module 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory module) and memory slot, a PCMCIA slot and card, and other fixed or removable storage units 1422 and interfaces 1420 that allow software and data to be transferred from the storage unit 1422 to computing module 1400.

Computing module 1400 might also include a communications interface 1424. Communications interface 1424 might be used to allow software and data to be transferred between computing module 1400 and external devices. Examples of communications interface 1424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1400 to perform features or functions of the disclosed technology as discussed herein.

While various embodiments of the disclosed technology have been described above, it should be understood that they have been presented by way of example only, and not by way of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for creating an orthokeratological contact lens to be worn on a cornea, comprising:
   receiving, with a user interface, patient corrective parameters; and
   generating a target treatment curve for a target zone;
      wherein generating the target treatment curve comprises calculating a difference of a first arc length determined when a load is applied to the cornea and a second arc length when no load is applied to the cornea, the first arc length and the second arc length are each calculated using the equation:

$$l = \int_{-d}^{+d} \sqrt{1 + (f'(x))^2}\, dx;$$

wherein $f(x) = a\,x^2 + bx + c$; and
   coefficients a, b, and c represent optical coherence tomography (OCT) measurements of the cornea;

producing a rigid contact lens with a lens surface comprising:
- a treatment zone extending radially outward from a center point of the rigid contact lens and shaped based on the target treatment curve as to cause collagen fibrils located in a stroma of a cornea to lengthen when the rigid contact lens makes contact with the cornea without putting significant pressure on or compressing the cornea;
- a return zone extending radially outward from the treatment zone, the return zone shaped to create an empty hypertrophy volume between the lens surface and the cornea when the rigid contact lens is applied to the cornea; and
- an alignment zone extending radially outward from the treatment zone, the alignment zone shaped to contact a surface of the cornea extending radially outward from the hypertrophy volume.

2. The method of claim 1, wherein the patient corrective parameters comprise a prescription change, a corneal diameter, a corneal thickness, and a corneal topography.

3. The method of claim 2, wherein the patient corrective parameters are received by an orthokeratology lens generation system comprising a processor with non-transitory computer readable media, data storage, and software embedded thereon.

4. The method of claim 1, further comprising generating a curve and width of the return zone in relation to the target treatment curve.

5. The method of claim 4, further comprising generating a curve and width of an alignment zone in relation to the curves for the target zone and the return zone.

6. The method of claim 1, further comprising applying rigid contact lens to the cornea such that the rigid contact lens rests on the cornea without applying significant pressure to or compressing the cornea.

7. The method of claim 6, wherein significant pressure is greater than $$\frac{2\Delta t t 2 E}{[Ar(1-v^2)1/2]}$$

wherein:
Δt: Thickness Change≅Result of Munnerlyn's Formula
t: Cental Cornea Thickness
E: Young's Modulus
A: Central Zone Area of Applanation
r: Corneal Radius
v: Poisson Ration=0.49.

8. The method of claim 6, wherein significant pressure is greater than 2 mm Hg.

9. The method of claim 1, further comprising a peripheral zone extending radially outward from the alignment zone shaped to create a lift off for tear layer configuration.

* * * * *